United States Patent
Kasada

(10) Patent No.: US 10,438,624 B2
(45) Date of Patent: *Oct. 8, 2019

(54) MAGNETIC TAPE HAVING CHARACTERIZED MAGNETIC LAYER

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,106

(22) Filed: Feb. 20, 2018

(65) Prior Publication Data

US 2018/0240475 A1  Aug. 23, 2018

(30) Foreign Application Priority Data

Feb. 20, 2017 (JP) .................. 2017-029499

(51) Int. Cl.
*G11B 5/71* (2006.01)
*G11B 5/008* (2006.01)
(Continued)

(52) U.S. Cl.
CPC ............ *G11B 5/71* (2013.01); *G11B 5/00813* (2013.01); *G11B 5/588* (2013.01); *G11B 5/70* (2013.01); *G11B 5/7013* (2013.01); *G11B 5/7085* (2013.01); *G11B 5/70678* (2013.01); *G11B 5/7305* (2013.01); *G11B 5/78* (2013.01); *G11B 5/845* (2013.01)

(58) Field of Classification Search
None
See application file for complete search history.

(56) References Cited

U.S. PATENT DOCUMENTS

| 3,966,686 A | 6/1976 | Asakura et al. |
| 4,112,187 A | 9/1978 | Asakura et al. |

(Continued)

FOREIGN PATENT DOCUMENTS

| DE | 101 46 429 A1 | 3/2002 |
| GB | 2495356 A | 4/2013 |

(Continued)

OTHER PUBLICATIONS

U.S. Appl. No. 15/900,412, now U.S. Pat. No. 10,062,403.

(Continued)

*Primary Examiner* — Kevin M Bernatz
(74) *Attorney, Agent, or Firm* — Sughrue Mion, PLLC

(57) ABSTRACT

A magnetic tape includes a non-magnetic support; and a magnetic layer including ferromagnetic powder and a binding agent on the non-magnetic support. The center line average surface roughness Ra measured regarding the surface of the magnetic layer is less than or equal to 1.8 nm. The logarithmic decrement acquired by a pendulum viscoelasticity test performed regarding the surface of the magnetic layer is less than or equal to 0.050. The ferromagnetic powder is ferromagnetic hexagonal ferrite powder, the magnetic layer includes an abrasive, and the tilt cos θ of the ferromagnetic hexagonal ferrite powder with respect to the surface of the magnetic layer acquired by cross section observation performed using a scanning transmission electron microscope is 0.85 to 1.00.

4 Claims, 4 Drawing Sheets

(51) Int. Cl.
　　　*G11B 5/73*　　　(2006.01)
　　　*G11B 5/588*　　(2006.01)
　　　*G11B 5/708*　　(2006.01)
　　　*G11B 5/70*　　　(2006.01)
　　　*G11B 5/706*　　(2006.01)
　　　*G11B 5/78*　　　(2006.01)
　　　*G11B 5/845*　　(2006.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 8/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 6/1998 | Soui | |
| 5,827,600 A | 10/1998 | Ejiri et al. | |
| 6,099,957 A | 8/2000 | Yamamoto et al. | |
| 6,183,606 B1 | 2/2001 | Kuo et al. | |
| 6,207,252 B1 | 3/2001 | Shimomura | |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,893,746 B1 | 5/2005 | Kirino et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,279,739 B2 | 10/2012 | Kanbe et al. | |
| 8,524,108 B2 | 9/2013 | Hattori | |
| 8,535,817 B2* | 9/2013 | Imaoka | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 10/2016 | Xia et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2* | 7/2017 | Kasada | G11B 5/7013 |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2 | 8/2017 | Kasada | |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,116 B2 | 12/2017 | Ozawa et al. | |
| 9,959,894 B2 | 5/2018 | Omura | |
| 9,972,351 B1* | 5/2018 | Kaneko | G11B 5/00826 |
| 9,978,414 B1* | 5/2018 | Kaneko | G11B 5/3909 |
| 9,984,710 B2* | 5/2018 | Kasada | G11B 5/68 |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2* | 7/2018 | Kasada | G11B 5/78 |
| 10,026,434 B2* | 7/2018 | Oyanagi | G11B 5/70 |
| 10,026,435 B2 | 7/2018 | Kasada et al. | |
| 10,062,403 B1* | 8/2018 | Kasada | G11B 5/70 |
| 10,074,393 B2* | 9/2018 | Kaneko | G11B 5/70615 |
| 10,134,433 B2 | 11/2018 | Kasada et al. | |
| 10,170,144 B2 | 1/2019 | Ozawa et al. | |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1 | 9/2003 | Inoue | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 | 1/2011 | Kaneko et al. | |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1 | 2/2012 | Tanaka et al. | |
| 2012/0177951 A1 | 7/2012 | Yamazaki et al. | |

(56) References Cited

U.S. PATENT DOCUMENTS

| | | |
|---|---|---|
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1* | 3/2016 | Kobayashi ............... H05B 3/12 219/270 |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0337944 A1 | 11/2017 | Biskeborn et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1* | 12/2017 | Kasada ............... G11B 5/00813 |
| 2017/0372736 A1* | 12/2017 | Kaneko ................... G11B 5/588 |
| 2017/0372737 A1* | 12/2017 | Oyanagi ............ G11B 5/00813 |
| 2017/0372738 A1* | 12/2017 | Kasada ............... G11B 5/00813 |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1* | 12/2017 | Kaneko ................... G11B 5/584 |
| 2017/0372743 A1 | 12/2017 | Kasada et al. |
| 2017/0372744 A1 | 12/2017 | Ozawa et al. |
| 2018/0061446 A1* | 3/2018 | Kasada ............... G11B 5/00817 |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1* | 6/2018 | Kasada ................... G11B 5/70 |
| 2018/0182426 A1 | 6/2018 | Ozawa et al. |
| 2018/0182427 A1* | 6/2018 | Kasada ............. G11B 5/70678 |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240476 A1* | 8/2018 | Kasada ................... G11B 5/70 |
| 2018/0240478 A1* | 8/2018 | Kasada ................... G11B 5/70 |
| 2018/0240479 A1* | 8/2018 | Kasada ............... G11B 5/3909 |
| 2018/0240481 A1* | 8/2018 | Kasada ................. G11B 5/584 |
| 2018/0240488 A1 | 8/2018 | Kasada |
| 2018/0240489 A1* | 8/2018 | Kasada ................... G11B 5/70 |
| 2018/0240490 A1* | 8/2018 | Kurokawa ............... G11B 5/70 |
| 2018/0240491 A1* | 8/2018 | Ozawa ............... G11B 5/00813 |
| 2018/0240492 A1 | 8/2018 | Kasada |
| 2018/0240493 A1* | 8/2018 | Tada ..................... G11B 5/712 |
| 2018/0240494 A1 | 8/2018 | Kurokawa et al. |
| 2018/0240495 A1* | 8/2018 | Kasada ................. G11B 5/712 |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1* | 10/2018 | Oyanagi ................. G11B 5/70 |
| 2018/0350398 A1 | 12/2018 | Kawakami et al. |
| 2018/0350400 A1* | 12/2018 | Kaneko ............. G11B 5/70615 |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1* | 1/2019 | Kasada ............. G11B 5/00813 |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1* | 4/2019 | Kasada ............. G11B 5/00813 |
| 2019/0103131 A1* | 4/2019 | Kasada ............. G11B 5/00813 |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 64-57422 A | 3/1989 |
| JP | 64-60819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |

(56) References Cited

FOREIGN PATENT DOCUMENTS

| | | |
|---|---|---|
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-133997 A | 4/2004 |
| JP | 2004-185676 A | 7/2004 |
| JP | 2005-38579 A | 2/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-49731 A | 3/2010 |
| JP | 2011-48878 A | 3/2011 |
| JP | 2011-138566 A | 7/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-051493 A | 4/2016 |
| JP | 2016-71926 A | 5/2016 |
| JP | 2016-139451 A | 8/2016 |

OTHER PUBLICATIONS

U.S. Appl. No. 15/900,141, Pending.
U.S. Appl. No. 15/900,160, Pending.
U.S. Appl. No. 15/900,345, Pending.
U.S. Appl. No. 15/900,379, Pending.
U.S. Appl. No. 15/920,616, Pending.
U.S. Appl. No. 15/900,242, Pending.
U.S. Appl. No. 15/900,334, Pending.
U.S. Appl. No. 15/920,592, Pending.
U.S. Appl. No. 15/920,635, now U.S. Pat. No. 10,170,144.
U.S. Appl. No. 15/900,230, Pending.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-5 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2018, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.

(56) References Cited

OTHER PUBLICATIONS

Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Mar. 5, 2019 in U.S. Appl. No. 16/009,603.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.

(56) References Cited

OTHER PUBLICATIONS

Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Mar. 5, 2019 in U.S. Appl. No. 15/443,026.
Office Action dated Mar. 6, 2019 in U.S. Appl. No. 15/854,403.
Office Action dated Nov. 14, 2018 in U.S. Appl. No. 16/100,289.
Office Action dated Nov. 19, 2018 in U.S. Appl. No. 15/900,141.
Office Action dated Feb. 28, 2019 in U.S. Appl. No. 15/920,518.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 7, 2019 in U.S. Appl. No. 15/854,439.
Office Action dated Apr. 4, 2019 in U.S. Appl. No. 16/184,312.
Notice of Allowance dated Jun. 6, 2019 in U.S. Appl. No. 15/854,383.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Jun. 10, 2019 in U.S. Appl. No. 15/920,518.
Office Action dated Jun. 6, 2019 in U.S. Appl. No. 15/899,587.
Office Action dated May 23, 2019 in U.S. Appl. No. 15/388,911.
Notice of Allowance dated Jun. 25, 2019 in U.S. Appl. No. 15/620,916.
Office Action dated Jun. 25, 2019 in Japanese Application No. 2015-245144.
Notice of Allowance dated Jun. 27, 2019 in U.S. Appl. No. 15/854,439.
U.S. Appl. No. 15/052,115, U.S. Pat. No. 9,704,527.
U.S. Appl. No. 15/218,190, U.S. Pat. No. 9,721,606.
U.S. Appl. No. 15/280,195, Pending.
U.S. Appl. No. 15/422,821, Allowed.
U.S. Appl. No. 15/422,944, Allowed; QPIDS filed.
U.S. Appl. No. 15/466,143, Patented as U.S. Pat. No. 9,837,116.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/625,428, Allowed.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Pending.
U.S. Appl. No. 15/614,876, Allowed.
U.S. Appl. No. 15/620,916, Allowed.
U.S. Appl. No. 15/621,464, Allowed.
U.S. Appl. No. 15/626,720, Allowed; QPIDS filed.
U.S. Appl. No. 15/854,383, Allowed.
U.S. Appl. No. 15/854,507, Patented as U.S. Pat. No. 9,984,716.
U.S. Appl. No. 15/854,439, Allowed.
U.S. Appl. No. 15/854,506, Patented as U.S. Pat. No. 10,008,230.
U.S. Appl. No. 15/848,173, Allowed; QPIDS filed.
U.S. Appl. No. 15/628,814, Allowed; RCE filed.
U.S. Appl. No. 15/690,400, Pending.
U.S. Appl. No. 15/690,906, Pending.
U.S. Appl. No. 15/626,355, Allowed; RCE filed.
U.S. Appl. No. 15/627,696, Pending.
U.S. Appl. No. 14/870,618 Patented as U.S. Pat. No. 9,959,894.
U.S. Appl. No. 15/388,911, Pending.
U.S. Appl. No. 14/753,227, Patented as No. U.S. Pat. No. 9,601,146.
U.S. Appl. No. 15/380,309, Allowed.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as No. U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,433.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Allowed; QPIDS filed.
U.S. Appl. No. 15/854,409, Allowed; QPIDS filed.
U.S. Appl. No. 15/443,026, Pending.
U.S. Appl. No. 15/920,782, Patented as U.S. Pat. No. 10,134,433.
U.S. Appl. No. 15/920,563, Allowed; QPIDS filed.
U.S. Appl. No. 15/920,533, Pending.
U.S. Appl. No. 15/900,144, Pending.
U.S. Appl. No. 15/900,080, Allowed.
U.S. Appl. No. 15/900,230, Allowed.
U.S. Appl. No. 15/900,164, Allowed.
U.S. Appl. No. 15/920,518, Pending.
U.S. Appl. No. 15/899,587, Pending.

(56) References Cited

OTHER PUBLICATIONS

U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed; QPIDS filed.
U.S. Appl. No. 16/009,603, Allowed.
U.S. Appl. No. 16/182,083, Pending (Continuation of U.S. Appl. No. 15/920,768).
U.S. Appl. No. 15/705,531, Pending.
U.S. Appl. No. 16/232,165, Pending (Continuation of U.S. Appl. No. 15/854,438).
U.S. Appl. No. 16/100,289, Allowed; RCE filed.
U.S. Appl. No. 16/038,669, Pending.
U.S. Appl. No. 15/900,106 (the present Application), Allowed.
U.S. Appl. No. 15/900,412, Patented as U.S. Pat. No. 10,062,4032.
U.S. Appl. No. 15/900,141, Allowed.
U.S. Appl. No. 15/900,160, Allowed.
U.S. Appl. No. 15/900,345, Allowed.
U.S. Appl. No. 15/900,379, Allowed.
U.S. Appl. No. 16/012,018, Pending.
U.S. Appl. No. 15/920,616, Allowed.
U.S. Appl. No. 15/900,242, Allowed.
U.S. Appl. No. 15/900,334, Allowed.
U.S. Appl. No. 15/920,592, Allowed.
U.S. Appl. No. 15/920,635, Patented as U.S. Pat. No. 10,170,144.
U.S. Appl. No. 16/160,377, Pending.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Allowed.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Pending.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.

* cited by examiner

MAGNETIC TAPE HAVING CHARACTERIZED MAGNETIC LAYER

CROSS-REFERENCE TO RELATED APPLICATIONS

This application claims priority under 35 U.S.C 119 to Japanese Patent Application No. 2017-029499 filed on Feb. 20, 2017. The above application is hereby expressly incorporated by reference, in its entirety, into the present application.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for storage such as data back-up. The recording and reproducing of information to the magnetic tape are normally performed by allowing the magnetic tape to run in a drive and bringing the surface of the magnetic layer of the magnetic tape to come into contact with a magnetic head (hereinafter, also simply referred to as a "head") to slide thereon.

In the field of magnetic recording, the improvement of electromagnetic conversion characteristics is constantly required. In regards to this point, JP2010-49731A, for example, discloses that a magnetic recording medium having excellent electromagnetic conversion characteristics is obtained by increasing surface smoothness of a magnetic layer (for example, see paragraphs 0020 and 0178 of JP2010-49731A).

SUMMARY OF THE INVENTION

Increasing surface smoothness of a surface of a magnetic layer of a magnetic tape is an effective method for narrowing an interval (spacing) between a surface of a magnetic layer of a magnetic tape and a head to improve electromagnetic conversion characteristics.

However, in such studies of the inventor, it was clear that a decrease in reproducing output is observed while repeating the running in the magnetic tape in which surface smoothness of the magnetic layer is increased.

Therefore, an object of the invention is to provide a magnetic tape which includes a magnetic layer having high surface smoothness and in which a decrease in reproducing output during repeated running is prevented.

According to one aspect of the invention, there is provided a magnetic tape comprising: a non-magnetic support; and a magnetic layer including ferromagnetic powder and a binding agent on the non-magnetic support, in which a center line average surface roughness Ra measured regarding the surface of the magnetic layer is equal to or smaller than 1.8 nm, a logarithmic decrement acquired by a pendulum viscoelasticity test performed regarding the surface of the magnetic layer is equal to or smaller than 0.050, the ferromagnetic powder is ferromagnetic hexagonal ferrite powder, the magnetic layer includes an abrasive, and a tilt cos θ of the ferromagnetic hexagonal ferrite powder with respect to a surface of the magnetic layer acquired by cross section observation performed by using a scanning transmission electron microscope is 0.85 to 1.00.

In the invention and the specification, the "ferromagnetic hexagonal ferrite powder" means an aggregate of a plurality of ferromagnetic hexagonal ferrite particles. Hereinafter, particles (ferromagnetic hexagonal ferrite particles) configuring the ferromagnetic hexagonal ferrite powder are also referred to as "hexagonal ferrite particles". The "aggregate" not only includes an aspect in which particles configuring the aggregate directly come into contact with each other, but also includes an aspect in which a binding agent, an additive, or the like is interposed between the particles.

The points described above are also applied to various powders such as non-magnetic powder of the invention and the specification, in the same manner.

In one aspect, the logarithmic decrement is 0.010 to 0.050.

In one aspect, the center line average surface roughness Ra is 1.2 nm to 1.8 nm.

In one aspect, the magnetic tape further includes a non-magnetic layer including non-magnetic powder and a binding agent between the non-magnetic support and the magnetic layer.

In one aspect, the magnetic tape includes a back coating layer including non-magnetic powder and a binding agent on a surface side of the non-magnetic support opposite to the surface side provided with the magnetic layer.

According to one aspect of the invention, it is possible to increase surface smoothness of the magnetic layer and prevent a decrease in reproducing output during repeated running.

DESCRIPTION OF THE PREFERRED EMBODIMENTS

Figure 1:
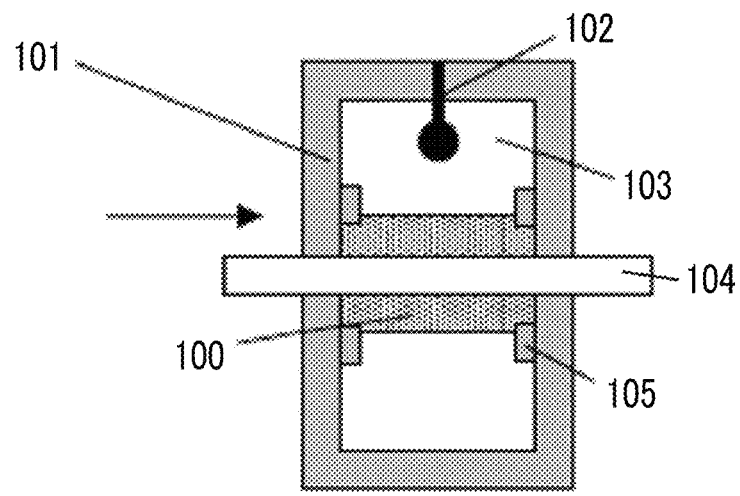
FIG. 1 is an explanatory diagram of a measurement method of a logarithmic decrement.

In an aspect of the invention, there is provided a magnetic tape including: a non-magnetic support; and a magnetic layer including ferromagnetic powder and a binding agent on the non-magnetic support, in which a center line average surface roughness Ra measured regarding the surface of the magnetic layer (hereinafter, also simply referred to as a "magnetic layer surface roughness Ra") is equal to or smaller than 1.8 nm, a logarithmic decrement acquired by a pendulum viscoelasticity test performed regarding the surface of the magnetic layer (hereinafter, also referred to as a "back coating layer side logarithmic decrement" or simply "logarithmic decrement") is equal to or smaller than 0.050, the ferromagnetic powder is ferromagnetic hexagonal ferrite powder, the magnetic layer includes an abrasive, and a tilt cos θ (hereinafter, also simply referred to as "cos θ") of the ferromagnetic hexagonal ferrite powder with respect to a surface of the magnetic layer acquired by cross section observation performed by using a scanning transmission electron microscope is 0.85 to 1.00.

Hereinafter, the magnetic tape will be described more specifically.

Magnetic Layer Surface Roughness Ra

The center line average surface roughness Ra measured regarding the surface of the magnetic layer of the magnetic tape is equal to or smaller than 1.8 nm. Accordingly, the magnetic tape can exhibit excellent electromagnetic conversion characteristics. From a viewpoint of further improving the electromagnetic conversion characteristics, the magnetic layer surface roughness Ra is preferably equal to or smaller than 1.7 nm, even more preferably equal to or smaller than 1.6 nm, and still more preferably equal to or smaller than 1.5 nm. In addition, the magnetic layer surface roughness Ra can be equal to or greater than 1.0 nm or equal to or greater than 1.2 nm. However, from a viewpoint of improving the electromagnetic conversion characteristics, low magnetic layer surface roughness Ra is preferable, and thus, the magnetic layer surface roughness Ra may be lower than the exemplified lower limit.

In the invention and the specification, the center line average surface roughness Ra measured regarding the surface of the magnetic layer of the magnetic tape is a value measured with an atomic force microscope (AFM) in a region, of the surface of the magnetic layer, having an area of 40 μm×40 μm. As an example of the measurement conditions, the following measurement conditions can be used. The magnetic layer surface roughness Ra shown in examples which will be described later is a value obtained by the measurement under the following measurement conditions. In the invention and the specification, the "surface of the magnetic layer" of the magnetic tape is identical to the surface of the magnetic tape on the magnetic layer side.

The measurement is performed regarding the region of 40 μm×40 μm of the area of the surface of the magnetic layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 μm/sec, and a resolution is set as 512 pixel×512 pixel.

The magnetic layer surface roughness Ra can be controlled by a well-known method. For example, the magnetic layer surface roughness Ra can be changed in accordance with the size of various powders included in the magnetic layer or manufacturing conditions of the magnetic tape. Thus, by adjusting one or more of these, it is possible to obtain a magnetic tape having the magnetic layer surface roughness Ra equal to or smaller than 1.8 nm.

The inventors have found that, in the magnetic tape having the magnetic layer surface roughness Ra equal to or smaller than 1.8 nm, in a case where any measures are not prepared, the reproducing output is decreased while repeating running. It is clear that the decrease in reproducing output significantly occurs in a case of repeated running of the magnetic tape at a high speed in an environment of a high temperature and low humidity. The environment of a high temperature and low humidity here is, for example, an environment in which an atmosphere temperature is 30° C. to 45° C. and relative humidity is 5% to 20%. The running at a high speed is, for example, running of the magnetic tape at a running speed equal to or higher than 6.0 m/sec.

Therefore, as a result of intensive studies of the inventors, the inventors have newly found that it is possible to prevent a decrease in reproducing output during repeated running in the environment of a high temperature and low humidity, by respectively setting the logarithmic decrement and the cos θ as described above, in the magnetic tape having the magnetic layer surface roughness Ra equal to or smaller than 1.8 nm. Details of this point will be described later.

It is thought that the decrease in reproducing output occurs because components derived from the magnetic tape are attached to the head from the surface of the magnetic layer due to continuous sliding between the surface of the magnetic layer and the head at the time of repeating the running of the magnetic tape, and the attached components (hereinafter, referred to as "head attached materials") are not sufficiently removed and exist between the surface of the magnetic layer and the head (so-called spacing loss).

Thus, the inventors have made research regarding (1) a decrease in amount of the components attached to the head from the surface of the magnetic layer and (2) removal of head attached materials at the time of sliding on the surface of the magnetic layer due to abrasion properties of the surface of the magnetic layer. As a result, the inventors have considered that the logarithmic decrement set as described above contributes to (1) and the cos θ set as described above contributes to (2), respectively. The logarithmic decrement and the cos θ will be described later specifically. By doing so, the magnetic tape according to one aspect of the invention has been completed. However, the above and following descriptions include the surmise of the inventors. The invention is not limited to such a surmise.

Logarithmic Decrement

The logarithmic decrement acquired by a pendulum viscoelasticity test performed regarding the surface of the magnetic layer of the magnetic tape is equal to or smaller than 0.050. This can contribute to prevention of a decrease in reproducing output, in a case of the repeated running of the magnetic tape having the magnetic layer surface roughness Ra in the range described above. From a viewpoint of further preventing a decrease in reproducing output, the logarithmic decrement is preferably equal to or smaller than 0.048, more preferably equal to or smaller than 0.045, even more preferably equal to or smaller than 0.040, and still more preferably equal to or smaller than 0.035. In addition, the logarithmic decrement can be, for example, equal to or greater than 0.010 or equal to or greater than 0.015. From a viewpoint of preventing a decrease in reproducing output, the logarithmic decrement tends to be preferable, as it is low. Therefore, the logarithmic decrement may be lower than the lower limit exemplified above.

In the invention and the specification, the logarithmic decrement described above is a value acquired by the following method.

Figure 2:
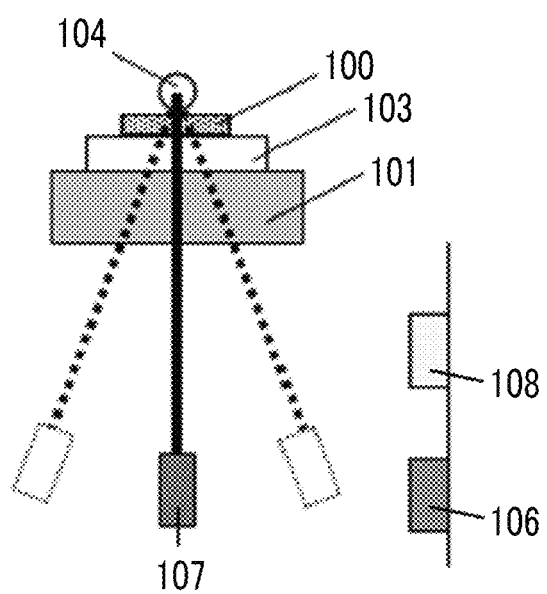
FIG. 2 is an explanatory diagram of the measurement method of a logarithmic decrement.
Figure 3:
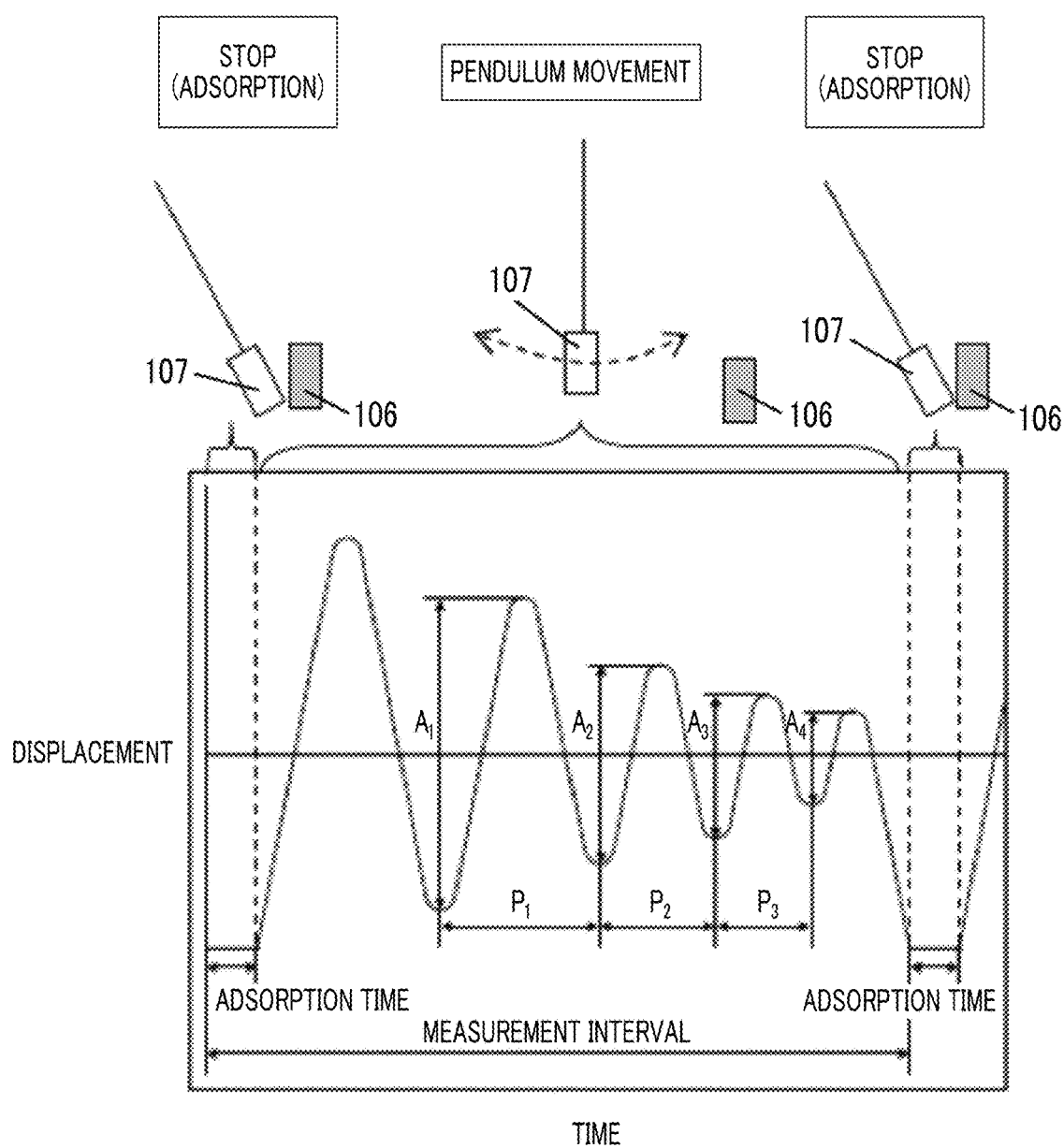
FIG. 3 is an explanatory diagram of the measurement method of a logarithmic decrement.

FIGS. 1 to 3 are explanatory diagrams of a measurement method of the logarithmic decrement. Hereinafter, the measurement method of the logarithmic decrement will be described with reference to the drawings. However, the aspect shown in the drawing is merely an example and the invention is not limited thereto.

A measurement sample 100 is cut out from the magnetic tape which is a measurement target. The cut-out measurement sample 100 is placed on a substrate 103 so that a measurement surface (surface of the magnetic layer) faces upwards, in a sample stage 101 in a pendulum viscoelasticity tester, and the measurement sample is fixed by fixing tapes 105 in a state where obvious wrinkles which can be visually confirmed are not generated.

A pendulum-attached columnar cylinder edge 104 (diameter of 4 mm) having mass of 13 g is loaded on the measurement surface of the measurement sample 100 so that a long axis direction of the cylinder edge becomes parallel to a longitudinal direction of the measurement sample 100.

An example of a state in which the pendulum-attached columnar cylinder edge 104 is loaded on the measurement surface of the measurement sample 100 as described above (state seen from the top) is shown in FIG. 1. In the aspect shown in FIG. 1, a holder and temperature sensor 102 is installed and a temperature of the surface of the substrate 103 can be monitored. However, this configuration is not essential. In the aspect shown in FIG. 1, the longitudinal direction of the measurement sample 100 is a direction shown with an arrow in the drawing, and is a longitudinal direction of a magnetic tape from which the measurement sample is cut out. In the invention and the specification, the description regarding "parallel" includes a range of errors allowed in the technical field of the invention. For example, the range of errors means a range within ±10° from an exact parallel state, and the error from the exact parallel state is preferably within ±5° and more preferably within ±30. In addition, as a pendulum 107 (see FIG. 2), a pendulum formed of a material having properties of being adsorbed to a magnet (for example, formed of metal or formed of an alloy) is used.

The temperature of the surface of the substrate 103 on which the measurement sample 100 is placed is set to 80° C. by increasing the temperature at a rate of temperature increase equal to or lower than 5° C./min (arbitrary rate of temperature increase may be set, as long as it is equal to or lower than 5° C./min), and the pendulum movement is started (induce initial vibration) by releasing adsorption between the pendulum 107 and a magnet 106. An example of a state of the pendulum 107 which performs the pendulum movement (state seen from the side) is shown in FIG. 2. In the aspect shown in FIG. 2, in the pendulum viscoelasticity tester, the pendulum movement is started by stopping (switching off) the electricity to the magnet (electromagnet) 106 disposed on the lower side of the sample stage to release the adsorption, and the pendulum movement is stopped by restarting (switching on) the electricity to the electromagnet to cause the pendulum 107 to be adsorbed to the magnetic 106. As shown in FIG. 2, during the pendulum movement, the pendulum 107 reciprocates the amplitude. From a result obtained by monitoring displacement of the pendulum with a displacement sensor 108 while the pendulum reciprocates the amplitude, a displacement-time curve in which a vertical axis indicates the displacement and a horizontal axis indicates the elapsed time is obtained.

An example of the displacement-time curve is shown in FIG. 3. FIG. 3 schematically shows correspondence between the state of the pendulum 107 and the displacement-time curve. The rest (adsorption) and the pendulum movement are repeated at a regular measurement interval, the logarithmic decrement Δ (no unit) is acquired from the following Expression by using a displacement-time curve obtained in the measurement interval after 10 minutes or longer (may be arbitrary time, as long as it is 10 minutes or longer) has elapsed, and this value is set as logarithmic decrement of the surface of the magnetic layer of the magnetic tape. The adsorption time of the first adsorption is set as 1 second or longer (may be arbitrary time, as long as it is 1 second or longer), and the interval between the adsorption stop and the adsorption start is set as 6 seconds or longer (may be arbitrary time, as long as it is 6 seconds or longer). The measurement interval is an interval of the time from the adsorption start and the next adsorption start. In addition, humidity of an environment in which the pendulum movement is performed, may be arbitrary relative humidity, as long as the relative humidity is 40% to 70%.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, an interval between a point of the minimum displacement and a point of the next minimum displacement is set as a period of a wave. n indicates the number of waves included in the displacement-time curve in the measurement interval, and An indicates the minimum displacement and maximum displacement of the n-th wave. In FIG. 3, an interval between the minimum displacement of the n-th wave and the next minimum displacement is shown as Pn (for example, $P_1$ regarding the first wave, $P_2$ regarding the second wave, and $P_3$ regarding the third wave). In the calculation of the logarithmic decrement, a difference (in Expression $A_{n+1}$, in the displacement-time curve shown in FIG. 3, $A_4$) between the minimum displacement and the maximum displacement appearing after the n-th wave is also used, but a part where the pendulum 107 stops (adsorption) after the maximum displacement is not used in the counting of the number of waves. In addition, a part where the pendulum 107 stops (adsorption) before the maximum displacement is not used in the counting of the number of waves, either. Accordingly, the number of waves is 3 (n=3) in the displacement-time curve shown in FIG. 3.

The inventors have considered regarding the logarithmic decrement described above as follows. However, the below description is merely a surmise and the invention is not limited thereto.

It is possible to improve electromagnetic conversion characteristics by increasing the surface smoothness of the surface of the magnetic layer of the magnetic tape. Meanwhile, it is thought that, in a case where the surface smoothness is increased, a contact area (so-called real contact area) between the surface of the magnetic layer and the head during repeated running increases. Accordingly, the invention have surmised that components derived from the magnetic tape are easily attached to the head from the surface of the magnetic layer and are attached and accumulated on the head while repeating the running, thereby causing spacing loss which is a reason of a decrease in reproducing output. With respect to this, the inventors have thought that the components attached and accumulated on the head includes pressure sensitive adhesive components separated from the surface of the magnetic layer. In addition, the inventors have considered that the logarithmic decrement is a value which may be an index for the amount of the pressure sensitive adhesive components and the value equal to or smaller than 0.050 means a decrease in amount of the pressure sensitive adhesive components attached to the head from the surface of the magnetic layer. The details of the pressure sensitive adhesive components are not clear, but the inventors have surmised that the pressure sensitive adhesive components may be derived from a resin used as a binding agent. The specific description is as follows. As a binding agent, various resins can be used as will be described later in detail. The resin is a polymer (including a homopolymer or a copolymer) of two or more polymerizable compounds and generally also includes a component having a molecular weight which is smaller than an average molecular weight (hereinafter, referred to as a "binding agent component having a low molecular weight"). The inventors have surmised that the binding agent component having a low molecular weight which is separated from the surface of the magnetic layer during the running and attached and accumulated on the head while repeating the running may cause the spacing loss which is a reason of a decrease in reproducing output. The inventors have surmised that, the binding agent component having a low molecular weight may have pressure sensitive adhesive properties and the logarithmic decrement acquired by a pendulum viscoelasticity test may be an index for the amount of the component attached and accumulated on the head during the running. In one aspect, the magnetic layer is formed by applying a magnetic layer forming composition including a curing agent in addition to ferromagnetic powder and a binding agent onto a non-magnetic support directly or with another layer interposed therebetween, and performing curing process. With the curing process here, it is possible to allow a curing reaction (crosslinking reaction) between the binding agent and the curing agent. However, although the reason thereof is not clear, the inventors have considered that the binding agent component having a low molecular weight may have poor reactivity regarding the curing reaction. Accordingly, the inventors have surmised that the binding agent component having a low molecular weight which hardly remains in the magnetic layer and is easily separated from the magnetic layer and attached to the head may be one of reasons for that the binding agent component having a low molecular weight is attached and accumulated on the head during the running.

A specific aspect of a method for adjusting the logarithmic decrement will be described later.

cos θ

In the magnetic tape, the tilt cos θ of the ferromagnetic hexagonal ferrite powder with respect to the surface of the magnetic layer acquired by the cross section observation performed by using a scanning transmission electron microscope is 0.85 to 1.00. The cos θ is preferably equal to or greater than 0.87, more preferably equal to or greater than 0.89, even more preferably equal to or greater than 0.90, still more preferably equal to or greater than 0.92, and still even more preferably equal to or greater than 0.95. Meanwhile, in a case where all of the hexagonal ferrite particles having an aspect ratio and a length in a long axis direction which will be described later are present in parallel with the surface of the magnetic layer, the cos θ becomes 1.00 which is the maximum value. According to the research of the inventor, it is found that, as the value of the cos θ increases, a decrease in reproducing output during the repeated running tends to be even more prevented. That is, a greater value of the cos θ is preferable, from a viewpoint of preventing a decrease in reproducing output during the repeated running. Accordingly, in the magnetic tape, the upper limit of the cos θ is equal to or smaller than 1.00. The cos θ may be, for example, equal to or smaller than 0.99. However, as described above, a greater value of the cos θ is preferable, and thus, the cos θ may exceed 0.99.

Calculation Method of cos θ

The cos θ is acquired by the cross section observation performed by using a scanning transmission electron microscope (STEM). The cos θ of the invention and the specification is a value measured and calculated by the following method.

(1) A cross section observation sample is manufactured by performing the cutting out from an arbitrarily determined position of the magnetic tape which is a target for acquiring the cos θ. The manufacturing of the cross section observation sample is performed by focused ion beam (FIB) processing using a gallium ion ($Ga^+$) beam. A specific example of such a manufacturing method is shown in an example which will be described later.

(2) The manufactured cross section observation sample is observed with the STEM, and a STEM images are captured. The STEM images are captured at positions of the same cross section observation sample arbitrarily selected, except for selecting so that the imaging ranges are not overlapped, and total 10 images are obtained. The STEM image is a STEM-high-angle annular dark field (HAADF) image which is captured at an acceleration voltage of 300 kV and a magnification ratio of imaging of 450,000, and the imaging is performed so that entire region of the magnetic layer in a thickness direction is included in one image. The entire region of the magnetic layer in the thickness direction is a region from the surface of the magnetic layer observed in the cross section observation sample to an interface between a layer adjacent to the magnetic layer or the non-magnetic support adjacent to the magnetic layer. The adjacent layer is a non-magnetic layer, in a case where the magnetic tape which is a target for acquiring the cos θ includes the non-magnetic layer which will be described later between the magnetic layer and the non-magnetic support. Meanwhile, in a case where the magnetic tape which is a target for acquiring the cos θ includes the magnetic layer directly on the surface of the non-magnetic support, the interface is an interface between the magnetic layer and the non-magnetic support.

(3) In each STEM image obtained as described above, a linear line connecting both ends of a line segment showing the surface of the magnetic layer is determined as a reference line. In a case where the STEM image is captured so that the magnetic layer side of the cross section observation sample is positioned on the upper side of the image and the non-magnetic support side is positioned on the lower side, for example, the linear line connecting both ends of the line segment described above is a linear line connecting an intersection between a left side of the image (normally, having a rectangular or square shape) of the STEM image and the line segment, and an intersection between a right side of the STEM image and the line segment to each other.

(4) Among the hexagonal ferrite particles observed in the STEM image, an angle θ formed by the reference line and the long axis direction of the hexagonal ferrite particles (primary particles) having an aspect ratio in a range of 1.5 to 6.0 and a length in the long axis direction equal to or greater than 10 nm is measured, and regarding the measured angle θ, the cos θ is calculated as a cos θ based on a unit circle. The calculation of the cos θ is performed with 30 particles arbitrarily extracted from the hexagonal ferrite particles having the aspect ratio and the length in the long axis direction in each STEM image.

(5) The measurement and the calculation are respectively performed for 10 images, the values of the acquired cos θ of the 30 hexagonal ferrite particles of each image, that is, 300 hexagonal ferrite particles in total of the 10 images, are averaged. The arithmetical mean acquired as described above is set as the tilt cos θ of the ferromagnetic hexagonal ferrite powder with respect to the surface of the magnetic layer acquired by the cross section observation performed by using the scanning transmission electron microscope.

Here, the "aspect ratio" observed in the STEM image is a ratio of "length in the long axis direction/length in a short axis direction" of the hexagonal ferrite particles.

The "long axis direction" means a direction in a case where an end portion close to the reference line and an end portion far from the reference line are connected to each other, among the end portions which are most separated from each other, in the image of one hexagonal ferrite particle observed in the STEM image. In a case where a line segment connecting one end portion and the other end portion is parallel with the reference line, a direction parallel to the reference line becomes the long axis direction.

The "length in the long axis direction" means a length of a line segment drawn by connecting end portions which are most separated from each other, in the image of one hexagonal ferrite particle observed in the STEM image. Meanwhile, the "length in the short axis direction" means a length of the longest line segment, among the line segments connecting two intersections between an outer periphery of the image of the particle and a perpendicular line with respect to the long axis direction.

In addition, the angle θ formed by the reference line and the tilt of the particle in the long axis direction is determined to be in a range of 0° to 90°, by setting an angle of the long axis direction parallel to the reference line as 0°. Hereinafter, the angle θ will be further described with reference to the drawings.

Figure 4:
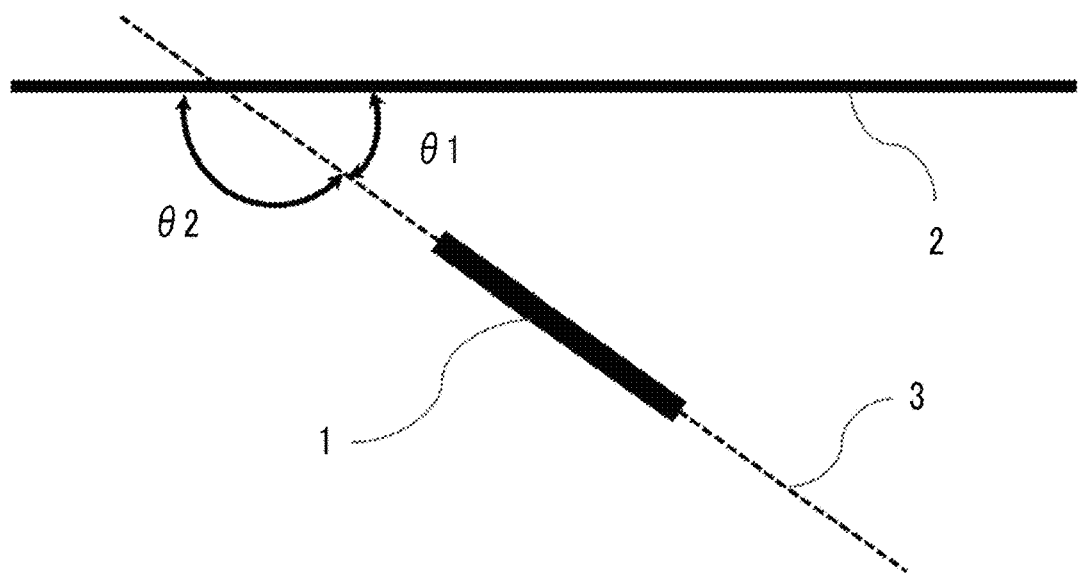
FIG. 4 is an explanatory diagram of an angle θ regarding a cos θ.
Figure 5:
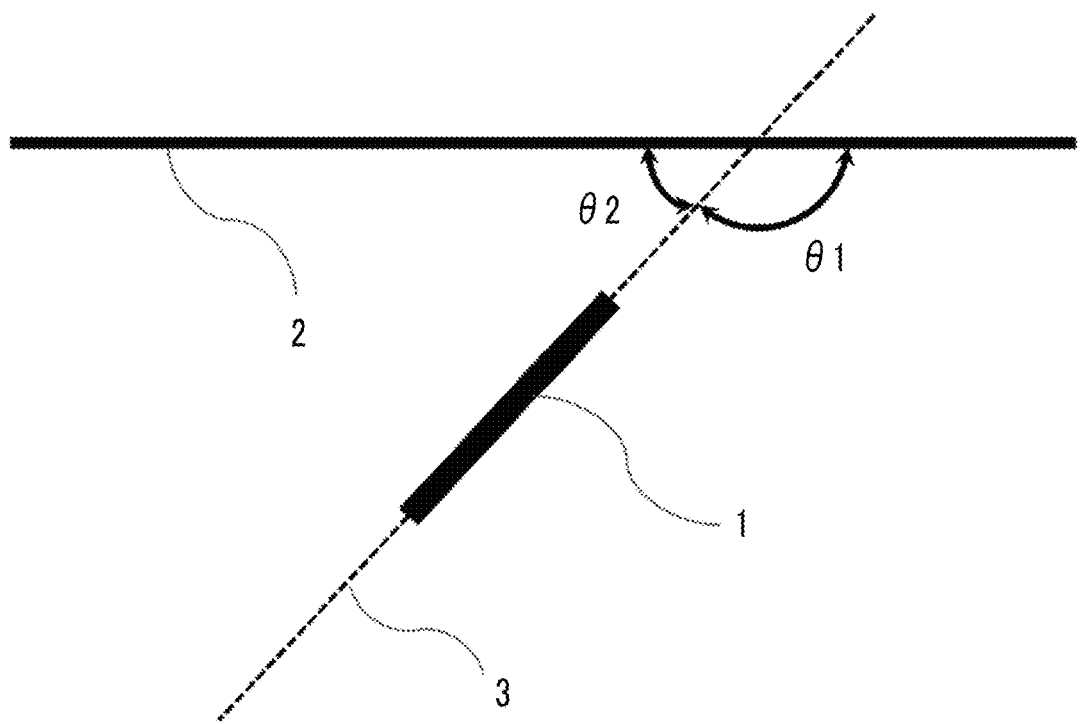
FIG. 5 is an explanatory diagram of another angle θ regarding a cos θ.

FIG. 4 and FIG. 5 are explanatory diagrams of the angle θ. In FIG. 4 and FIG. 5, a reference numeral 1 indicates a line segment (length in the long axis direction) drawn by connecting end portions which are most separated from each other, a reference numeral 2 indicates the reference line, and a reference numeral 3 indicates an extended line of the line segment (reference numeral 1). In this case, as the angle formed by the reference line 2 and the extended line 3, θ1 and θ2 are exemplified as shown in FIG. 4 and FIG. 5. Here, a smaller angle is used from the θ1 and θ2, and this is set as the angle θ. Accordingly, in the aspect shown in FIG. 4, the θ1 is set as the angle θ, and in the aspect shown in FIG. 5, θ2 is set as the angle θ. A case where θ1=θ2 is a case where the angle θ=90°. The cos θ based on the unit circle becomes 1.00, in a case where the θ=θ0, and becomes θ, in a case where the θ=90°.

The magnetic tape includes the ferromagnetic hexagonal ferrite powder and the abrasive in the magnetic layer, and cos θ is 0.85 to 1.00. The inventors have thought that hexagonal ferrite particles satisfying the aspect ratio in a range of 1.5 to 6.0 and the length in the long axis direction equal to or greater than 10 nm among the hexagonal ferrite particles configuring the ferromagnetic hexagonal ferrite powder included in the magnetic layer can support the abrasive. The inventors have thought that this point contributes to the removal of the head attached materials at the time of sliding on the surface of the magnetic layer due to abrasion properties of the surface of the magnetic layer. This point will be further described below.

The abrasive can impart a function of removing head attached materials (abrasion properties) to the surface of the magnetic layer. In a case where the surface of the magnetic layer exhibits abrasion properties, it is possible to remove the head attached materials, in a case where the surface of the magnetic layer and the head slide on each other. However, the inventors have surmised that, in a case where the abrasion properties of the surface of the magnetic layer are deteriorated, the reproducing is performed in a state where the head attached materials are present between the surface of the magnetic layer and the head, thereby decreasing reproducing output due to the spacing loss. The inventors have thought that a deterioration in abrasion properties of the surface of the magnetic layer occurs due to the abrasive present in the vicinity of the surface of the magnetic layer, which is pressed into the magnetic layer due to the contact with the head.

With respect to this, the inventors have considered that the pressing of the abrasive present in the vicinity of the surface of the magnetic layer into the magnetic layer due to the contact with the head can be prevented by supporting the abrasive by the hexagonal ferrite particles satisfying the aspect ratio in a range of 1.5 to 6.0 and the length in the long axis direction equal to or greater than 10 nm. Thus, the inventors have surmised that it is possible to prevent a deterioration in abrasion properties of the surface of the magnetic layer and as a result, it is possible to prevent a decrease in reproducing output during the repeated running.

A squareness ratio is known as an index of a presence state (orientation state) of the ferromagnetic hexagonal ferrite powder of the magnetic layer. However, according to the studies of the inventor, a correlation was not observed between a value of the squareness ratio and a degree of a decrease in reproducing output during the repeated running. The squareness ratio is a value indicating a ratio of residual magnetization with respect to saturated magnetization, and is measured using all of the particles as targets, regardless of the shapes and size of the particles included in the ferromagnetic hexagonal ferrite powder. With respect to this, the cos θ is a value measured by selecting the hexagonal ferrite particles having the aspect ratio and the length in the long axis direction in the ranges described above. The inventors have thought that, due to such a difference, an excellent correlation between a value of cos θ and a degree of a decrease in reproducing output during the repeated running is not observed. However, this is merely a surmise, and the invention is not limited thereto.

Adjustment Method of cos θ

The magnetic tape can be manufactured through a step of applying a magnetic layer forming composition onto the surface of the non-magnetic support directly or with another layer interposed therebetween. As an adjustment method of the cos θ, a method of controlling a dispersion state of the ferromagnetic hexagonal ferrite powder of the magnetic layer forming composition is used. The inventors have thought that, as dispersibility of the ferromagnetic hexagonal ferrite powder in the magnetic layer forming composition (hereinafter, also simply referred to as "dispersibility of the ferromagnetic hexagonal ferrite powder" or "dispersibility") is increased, the hexagonal ferrite particles having the aspect ratio in a range of 1.5 to 6.0 and a length in the long axis direction equal to or greater than 10 nm in the magnetic layer formed by using this magnetic layer forming composition are easily oriented in a state closer to parallel to the surface of the magnetic layer. As means for increasing dispersibility, any one or both of the following methods (1) and (2) are used.

(1) Adjustment of Dispersion Conditions (2) Use of Dispersing Agent

In addition, as means for increasing dispersibility, a method of separately dispersing the ferromagnetic hexagonal ferrite powder and the abrasive is also used. The separate dispersing preferably includes preparing the magnetic layer forming composition through a step of mixing a magnetic solution including the ferromagnetic hexagonal ferrite powder, a binding agent, and a solvent (here, substantially not including an abrasive), and an abrasive liquid including an abrasive and a solvent with each other. By performing the mixing after separately dispersing the abrasive and the ferromagnetic hexagonal ferrite powder as described above, it is possible to increase the dispersibility of the ferromagnetic hexagonal ferrite powder in the magnetic layer forming composition. The expression of "substantially not including an abrasive" means that the abrasive is not added as a constituent component of the magnetic solution, and a small amount of the abrasive present as impurities by being mixed without intention is allowed. In addition, it is also preferable that any one or both of the methods (1) and (2) is combined with the separate dispersion described above. In this case, by controlling the dispersion state of the ferromagnetic hexagonal ferrite powder of the magnetic solution, it is possible to control the dispersion state of the ferromagnetic hexagonal ferrite powder of the magnetic layer forming composition obtained through the step of mixing the magnetic solution with the abrasive liquid.

For the (1) adjustment of dispersion conditions, a description disclosed in a paragraph 0039 of JP2016-177851A can be referred to as.

For the (2) use of dispersing agent, a description disclosed in paragraphs 0040 to 0143 of JP2016-177851A can be referred to as.

Next, the magnetic layer and the like included in the magnetic tape will be described more specifically.

Magnetic Layer

Ferromagnetic Powder

The magnetic layer includes ferromagnetic hexagonal ferrite powder as the ferromagnetic powder. As an index for a particle size of the ferromagnetic hexagonal ferrite powder, an activation volume can be used. The "activation volume" is a unit of magnetization reversal. Regarding the activation volume described in the invention and the specification, magnetic field sweep rates of a coercivity Hc measurement part at time points of 3 minutes and 30 minutes are measured by using an oscillation sample type magnetic-flux meter in an environment of an atmosphere temperature of 23° C.±1° C., and the activation volume is a value acquired from the following relational expression of Hc and an activation volume V.

$$Hc=2Ku/Ms\{1-[(kT/KuV)\ln(At/0.693)]^{1/2}\}$$

[In the expression, Ku: anisotropy constant, Ms: saturation magnetization, k: Boltzmann's constant, T: absolute temperature, V: activation volume, A: spin precession frequency, and t: magnetic field reversal time]

It is desired that recording density is increased (high-density recording is realized) in the magnetic tape, in accordance with a great increase in information content of recent years. As a method for achieving high-density recording, a method of decreasing a particle size of ferromagnetic powder included in a magnetic layer and increasing a filling percentage of the ferromagnetic powder of the magnetic layer is used. From this viewpoint, the activation volume of the ferromagnetic hexagonal ferrite powder is preferably equal to or smaller than 2,500 nm$^3$, more preferably equal to or smaller than 2,300 nm$^3$, and even more preferably equal to or smaller than 2,000 nm$^3$. Meanwhile, from a viewpoint of stability of magnetization, the activation volume is, for example, preferably equal to or greater than 800 nm$^3$, more preferably equal to or greater than 1,000 nm$^3$, and even more preferably equal to or greater than 1,200 nm$^3$. A percentage of the hexagonal ferrite particles having the aspect ratio in a range of 1.5 to 6.0 and a length in the long axis direction equal to or greater than 10 nm described above in all of the hexagonal ferrite particles observed in the STEM image, can be, for example, equal to or greater than 50%, as a percentage with respect to all of the hexagonal ferrite particles observed in the STEM image, based on the particle number. In addition, the percentage can be, for example, equal to or smaller than 95% and can exceed 95%. For other details of ferromagnetic hexagonal ferrite powder, for example, descriptions disclosed in paragraphs 0012 to 0030 of JP2011-225417A, paragraphs 0134 to 0136 of JP2011-216149A, and paragraphs 0013 to 0030 of JP2012-204726A can be referred to.

The content (filling percentage) of the ferromagnetic hexagonal ferrite powder of the magnetic layer is preferably in a range of 50 to 90 mass % and more preferably in a range of 60 to 90 mass %. The component other than the ferromagnetic hexagonal ferrite powder of the magnetic layer is at least a binding agent and an abrasive, and one or more kinds of additives can be arbitrarily included. A high filling percentage of the ferromagnetic hexagonal ferrite powder of the magnetic layer is preferable, from a viewpoint of improving recording density.

Binding Agent

The magnetic tape is a coating type magnetic tape, and the magnetic layer includes a binding agent together with the ferromagnetic powder and the abrasive. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. An molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Abrasive

The magnetic tape includes an abrasive in the magnetic layer. The abrasive means non-magnetic powder having Mohs hardness exceeding 8 and is preferably non-magnetic powder having Mohs hardness equal to or greater than 9. The abrasive may be powder of inorganic substances (inorganic powder) or may be powder of organic substances (organic powder), and is preferably inorganic powder. The abrasive is more preferably inorganic powder having Mobs hardness exceeding 8 and even more preferably inorganic powder having Mohs hardness equal to or greater than 9. A maximum value of Mobs hardness is 10 of diamond. Specifically, powders of alumina ($Al_2O_3$), silicon carbide, boron carbide ($B_4C$), TiC, cerium oxide, zirconium oxide ($ZrO_2$), diamond, and the like can be used as the abrasive, and among these, alumina powder is preferable. For the alumina powder, a description disclosed in a paragraph 0021 of JP2013-229090A can be referred to. In addition, a specific surface area can be used as an index of a particle size of the abrasive. A great value of the specific surface area means a small particle size. From a viewpoint of decreasing the magnetic layer surface roughness Ra, an abrasive having a specific surface area measured by Brunauer-Emmett-Teller (BET) method (hereinafter, referred to as a "BET specific surface area") which is equal to or greater than 14 $m^2/g$, is preferably used. In addition, from a viewpoint of dispersibility, an abrasive having a BET specific surface area equal to or smaller than 40 $m^2/g$, is preferably used. The content of the abrasive in the magnetic layer is preferably 1.0 to 20.0 parts by mass with respect to 100.0 parts by mass of the ferromagnetic powder.

Additives

The magnetic layer includes ferromagnetic hexagonal ferrite powder, a binding agent, and an abrasive, and may further include one or more additives, if necessary. As the additives, the curing agent described above is used as an example. In addition, examples of the additive which can be included in the magnetic layer include a non-magnetic filler, a lubricant, a dispersing agent, a dispersing assistant, an antifungal agent, an antistatic agent, an antioxidant, and carbon black. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer can be used. The projection formation agent is a component which can contribute to the controlling of friction properties of the surface of the magnetic layer. As the projection formation agent, various non-magnetic powders normally used as a projection formation agent can be used. These may be inorganic powder or organic powder. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably inorganic powder. Examples of the inorganic powder include powder of metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. In addition, in another aspect, the projection formation agent is preferably carbon black. An average particle size of the projection formation agent is, for example, 30 to 300 nm and is preferably 40 to 200 nm. In addition, from a viewpoint that the projection formation agent can exhibit the functions thereof in an excellent manner, the content of the projection formation agent in the magnetic layer is preferably 1.0 to 4.0 parts by mass and more preferably 1.5 to 3.5 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the abrasive in the magnetic layer forming composition in order to decrease the magnetic layer surface roughness Ra.

As the additives, a commercially available product or an additive prepared by a well-known method can be suitably selected and used according to the desired properties.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Back Coating Layer

The magnetic tape can also include a back coating layer including non-magnetic powder and a binding agent on a surface side of the non-magnetic support opposite to the surface side provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Various Thickness

A thickness of the non-magnetic support of the magnetic tape is preferably 3.00 to 80.00 µm, more preferably 3.00 to 6.00 µm, and even more preferably 3.00 to 4.50 µm.

A thickness of the magnetic layer can be optimized in accordance with saturation magnetization quantity of the magnetic head used, a head gap length, or a band of a recording signal. The thickness of the magnetic layer is normally 10 nm to 150 nm, and is preferably 20 nm to 120 nm and more preferably 30 nm to 100 nm, from a viewpoint of realizing high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.01 to 3.00 µm, preferably 0.05 to 2.00 µm, and more preferably 0.05 to 1.50 µm.

A thickness of the back coating layer is preferably equal to or smaller than 0.90 µm and more preferably 0.10 to 0.70 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. In the preparation of the magnetic layer forming composition, it is preferable that the ferromagnetic hexagonal ferrite powder and the abrasive are separately dispersed as described above. In addition, in order to manufacture the magnetic tape, a well-known manufacturing technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and one or more kinds of other dispersion beads can be used as a dispersion medium. As such dispersion beads, zirconia beads, titania beads, and steel beads which are dispersion beads having high specific gravity are suitable. The dispersion beads can be used by optimizing a bead diameter and a filling percentage of the dispersion beads. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 µm can be used, for example. As one of means for obtaining a magnetic tape having cos θ of 0.85 to 1.00, a technology of reinforcing the dispersion conditions (for example, increasing the dispersion time, decreasing the diameter of the dispersion beads used for dispersion and/or increasing the filling percentage of the dispersion beads, using the dispersing agent, and the like) is also preferable.

Coating Step, Cooling Step, Heating and Drying Step, Burnishing Treatment Step, and Curing Step The magnetic layer can be formed by directly applying the magnetic layer forming composition onto the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

In a preferred aspect, a magnetic layer can be formed through a magnetic layer forming step including a coating step of applying a magnetic layer forming composition including ferromagnetic powder, a binding agent, an abrasive, a curing agent, and a solvent onto a non-magnetic support directly or with another layer interposed therebetween, to form a coating layer, a heating and drying step of drying the coating layer by a heating process, and a curing step of performing a curing process with respect to the coating layer. The magnetic layer forming step preferably includes a cooling step of cooling the coating layer between the coating step and the heating and drying step, and more preferably includes a burnishing treatment step of performing a burnishing treatment with respect to the surface of the coating layer between the heating and drying step and the curing step.

The inventors have thought that it is preferable that the cooling step and the burnishing treatment step in the magnetic layer forming step, in order to set the logarithmic decrement to be equal to or smaller than 0.050. More specific description is as follows.

The inventors have surmised that performing the cooling step of cooling the coating layer between the coating step and the heating and drying step contributes to causing pressure sensitive adhesive component separated from the surface of the magnetic layer in a case where the head comes into contact with and slides on the surface of the magnetic layer, to be localized in the surface and/or a surface layer part in the vicinity of the surface of the coating layer. The inventors have surmised that this is because the pressure sensitive adhesive component at the time of solvent volatilization in the heating and drying step is easily moved to the surface and/or the surface layer part of the coating layer, by cooling the coating layer of the magnetic layer forming composition before the heating and drying step. However, the reason thereof is not clear. In addition, the inventors have thought that the pressure sensitive adhesive component can be removed by performing the burnishing treatment with respect to the surface of the coating layer in which the pressure sensitive adhesive component is localized on the surface and/or surface layer part. The inventors have surmised that performing the curing step after removing the pressure sensitive adhesive component contributes setting the logarithmic decrement to be equal to or smaller than 0.050. However, this is merely a surmise, and the invention is not limited thereto.

As described above, multilayer coating of the magnetic layer forming composition can be performed with the non-magnetic layer forming composition in order or at the same time. In a preferred aspect, the magnetic tape can be manufactured by successive multilayer coating. A manufacturing step including the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

Hereinafter, a specific aspect of the manufacturing method of the magnetic tape will be described with reference to FIG. 6. However, the invention is not limited to the following specific aspect.

Figure 6:
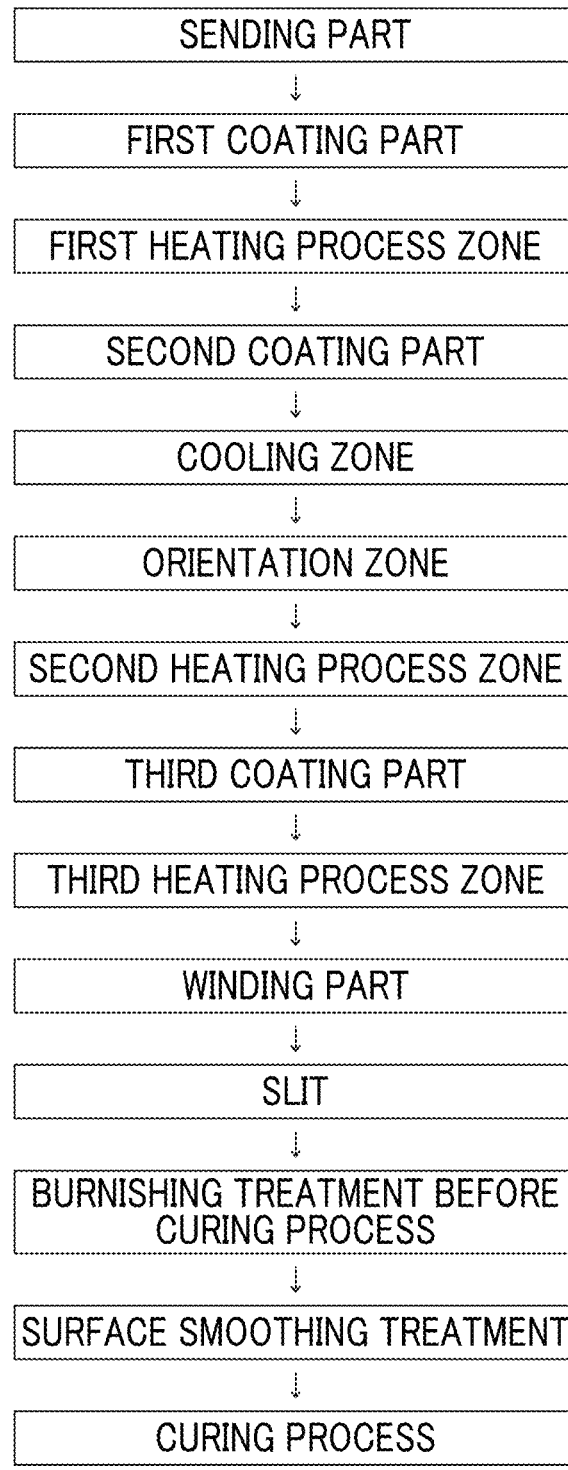
FIG. 6 shows an example (step schematic view) of a specific aspect of a magnetic tape manufacturing step.

FIG. 6 is a step schematic view showing a specific aspect of a step of manufacturing the magnetic tape including a non-magnetic layer and a magnetic layer in this order on one surface of a non-magnetic support and including a back coating layer on the other surface thereof. In the aspect shown in FIG. 6, an operation of sending a non-magnetic support (elongated film) from a sending part and winding the non-magnetic support around a winding part is continuously performed, and various processes of coating, drying, and orientation are performed in each part or each zone shown in FIG. 6, and thus, it is possible to sequentially form a non-magnetic layer and a magnetic layer on one surface of the running non-magnetic support by multilayer coating and to form a back coating layer on the other surface thereof. Such a manufacturing method can be set to be identical to the manufacturing method normally performed for manufacturing a coating type magnetic recording medium, except for including a cooling zone in the magnetic layer forming step and including the burnishing treatment step before the curing process.

The non-magnetic layer forming composition is applied onto the non-magnetic support sent from the sending part in a first coating part (coating step of non-magnetic layer forming composition).

After the coating step, in a first heating process zone, the coating layer of the non-magnetic layer forming composition formed in the coating step is heated after to dry the coating layer (heating and drying step). The heating and drying step can be performed by causing the non-magnetic support including the coating layer of the non-magnetic layer forming composition to pass through the heated atmosphere. An atmosphere temperature of the heated atmosphere here can be, for example, approximately 60° to 140°. Here, the atmosphere temperature may be a temperature at which the solvent is volatilized and the coating layer is dried, and the atmosphere temperature is not limited to the range described above. In addition, the heated air may blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After the coating step, a coating layer of the magnetic layer forming composition formed in the coating step is cooled in a cooling zone (cooling step). For example, it is possible to perform the cooling step by allowing the non-magnetic support on which the coating layer is formed on the non-magnetic layer to pass through a cooling atmosphere. An atmosphere temperature of the cooling atmosphere is preferably −10° C. to 0° C. and more preferably −5° C. to 0° C. The time for performing the cooling step (for example, time while an arbitrary part of the coating layer is delivered to and sent from the cooling zone (hereinafter, also referred to as a "staying time")) is not particularly limited. In a case where the staying time is long, the value of logarithmic decrement tends to be increased. Thus, the staying time is preferably adjusted by performing preliminary experiment if necessary, so that the logarithmic decrement equal to or smaller than 0.050 is realized. In the cooling step, cooled air may blow to the surface of the coating layer.

After that, while the coating layer of the magnetic layer forming composition is wet, an orientation process of the ferromagnetic powder in the coating layer is performed in an orientation zone. For the orientation process, a description disclosed in a paragraph 0052 of JP2010-24113A can be referred to. As one of means for obtaining a magnetic tape having cos θ of 0.85 to 1.00, a homeotropic alignment process is preferably performed.

The coating layer after the orientation process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By doing so, it is possible to obtain the magnetic tape including the coating layer of the magnetic layer forming composition heated and dried on the non-magnetic layer, on one surface side of the non-magnetic support, and the back coating layer on the other surface side thereof. The magnetic tape obtained here becomes a magnetic tape product after performing various processes which will be described later.

The obtained magnetic tape is wound around the winding part, and cut (slit) to have a size of a magnetic tape product. The slitting is performed by using a well-known cutter.

In the slit magnetic tape, the burnishing treatment is performed with respect to the surface of the heated and dried coating layer of the magnetic layer forming composition, before performing the curing process (heating and light irradiation) in accordance with the types of the curing agent included in the magnetic layer forming composition (burnishing treatment step between heating and drying step and curing step). The inventors have surmised that removing the pressure sensitive adhesive component transitioned to the surface and/or the surface layer part of the coating layer cooled in the cooling zone by the burnishing treatment contributes setting the logarithmic decrement to be equal to or smaller than 0.050. However, this is merely a surmise, and the invention is not limited thereto.

The burnishing treatment is treatment of rubbing a surface of a treatment target with a member (for example, a polishing tape, or a grinding tool such as a grinding blade or a grinding wheel), and can be performed in the same manner as the well-known burnishing treatment for manufacturing a coating type magnetic recording medium. However, in the related art, the burnishing treatment was not performed in a stage before the curing step, after performing the cooling step and the heating and drying step. With respect to this, the logarithmic decrement can be equal to or smaller than 0.050 by performing the burnishing treatment in the stage described above.

The burnishing treatment can be preferably performed by performing one or both of rubbing of the surface of the coating layer of the treatment target by a polishing tape (polishing) and rubbing of the surface of the coating layer of the treatment target by a grinding tool (grinding). In a case where the magnetic layer forming composition includes an abrasive, it is preferable to use a polishing tape including at least one of an abrasive having higher Mohs hardness than that of the abrasive described above. As the polishing tape, a commercially available product may be used and a polishing tape manufactured by a well-known method may be used. As the grinding tool, a well-known blade such as a fixed blade, a diamond wheel, or a rotary blade, or a grinding blade can be used. In addition, a wiping treatment of wiping the surface of the coating layer rubbed by the polishing tape and/or the grinding tool with a wiping material. For details of preferred polishing tape, grinding tool, burnishing treatment, and wiping treatment, descriptions disclosed in paragraphs 0034 to 0048, FIG. 1 and examples of JP1994-52544A (JP-H06-52544A) can be referred to. As the burnishing treatment is reinforced, the value of the logarithmic decrement tends to be decreased. The burnishing treatment can be reinforced as an abrasive having high hardness is used as the abrasive included in the polishing tape, and can be reinforced, as the amount of the abrasive in the polishing tape is increased. In addition, the burnishing treatment can be reinforced as a grinding tool having high hardness is used as the grinding tool. In regards to the burnishing treatment conditions, the burnishing treatment can be reinforced as a sliding speed between the surface of the coating layer of the treatment target and a member (for example, a polishing tape or a grinding tool) is increased. The sliding speed can be increased by increasing one or both of a speed at which the member is moved, and a speed at which the magnetic tape of the treatment target is moved.

After the burnishing treatment (burnishing treatment step), the curing process is performed with respect to the coating layer of the magnetic layer forming composition. In the aspect shown in FIG. 6, the coating layer of the magnetic layer forming composition is subjected to the surface smoothing treatment, after the burnishing treatment and before the curing process. The surface smoothing treatment is preferably performed by a calender process. For details of the calender process, for example, description disclosed in a paragraph 0026 of JP2010-231843A can be referred to. As the calender process is reinforced, the surface of the magnetic tape can be smoothened. The calender process is reinforced, as the surface temperature (calender temperature) of a calender roll is increased and/or as calender pressure is increased After that, the curing process according to the type of the curing agent included in the coating layer is performed with respect to the coating layer of the magnetic layer forming composition (curing step). The curing process can be performed by the process according to the type of the curing agent included in the coating layer, such as a heating process or light irradiation. The curing process conditions are not particularly limited, and the curing process conditions may be suitably set in accordance with the list of the magnetic layer forming composition used in the coating layer formation, the type of the curing agent, and the thickness of the coating layer. For example, in a case where the coating layer is formed by using the magnetic layer forming composition including polyisocyanate as the curing agent, the curing process is preferably the heating process. In a case where the curing agent is included in a layer other than the magnetic layer, a curing reaction of the layer can also be promoted by the curing process here. Alternatively, the curing step may be separately provided. After the curing step, the burnishing treatment may be further performed.

By doing so, it is possible to obtain a magnetic tape according to one aspect of the invention. However, the manufacturing method described above is merely an example, the magnetic layer surface roughness Ra, the logarithmic decrement, and the cos θ can be respectively controlled to be in the ranges described above by arbitrary methods capable of adjusting the magnetic layer surface roughness Ra, the logarithmic decrement, and the cos θ, and such an aspect is also included in the invention.

The magnetic tape according to one aspect of the invention described above is generally accommodated in a magnetic tape cartridge and the magnetic tape cartridge is mounted in a drive. The configuration of the magnetic tape cartridge and the drive is well known. The magnetic tape runs (is transported) in the drive, the magnetic head for recording and/or reproducing of information comes into contact with and slides on the surface of the magnetic layer, and the recording of the information on the magnetic tape and/or reproducing of the recorded information are performed. A running speed of the magnetic tape is also referred to as a transportation speed and is a relative speed of the magnetic tape and the head at the time of the magnetic tape running. It is preferable that the running speed is increased to cause the magnetic tape run at a high speed, in order to shorten the time necessary for recording information and/or time necessary for reproducing the recorded information. From this viewpoint, the running speed of the magnetic tape is, for example, preferably equal to or higher than 6.0 m/sec. Meanwhile, it was determined that, in the magnetic tape having the magnetic layer surface roughness Ra equal to or smaller than 1.8 nm, a decrease in reproducing output occurs, in a case of repeating the high-speed running in the environment of a high temperature and low humidity, without any measures. With respect to this, in the magnetic tape according to one aspect of the invention in which the magnetic layer surface roughness Ra is equal to or smaller than 1.8 nm and the logarithmic decrement and the cos θ are in the ranges described above, a decrease in reproducing output during the repeated high-speed running in the environment of a high temperature and low humidity can be prevented.

EXAMPLES

Hereinafter, the invention will be described with reference to examples. However, the invention is not limited to aspects shown in the examples. "Parts" and "%" in the following description mean "parts by mass" and "mass %", unless otherwise noted. In addition, steps and evaluations described below are performed in an environment of an atmosphere temperature of 23° C.±1° C., unless otherwise noted.

An average particle size of the powder of the invention and the specification is a value measured by a method disclosed in paragraphs 0058 to 0061 of JP2016-071926A. The measurement of the average particle size described below was performed by using transmission electron microscope H-9000 manufactured by Hitachi, Ltd. as the transmission electron microscope, and image analysis software KS-400 manufactured by Carl Zeiss as the image analysis software.

Example 1

1. Manufacturing of Magnetic Tape
(1) Preparation of Alumina Dispersion
3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.; Mohs hardness of 9) having an gelatinization ratio of 65% and a BET specific surface area of 20 $m^2/g$, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Solution
Ferromagnetic hexagonal ferrite (barium ferrite) powder: 100.0 parts
Activation volume: see Table 1
$SO_3Na$ group-containing polyurethane resin: 14.0 parts
Weight-average molecular weight: 70,000, $SO_3Na$ group: 0.2 meq/g
Dispersing agent: see Table 1
Type: see Table 1
Cyclohexanone: 150.0 parts
Methyl ethyl ketone: 150.0 parts
Abrasive Liquid
Alumina dispersion prepared in the section (1): 6.0 parts
Silica Sol (Projection Forming Agent Liquid)
Colloidal silica: 2.0 parts
Average particle size: 100 nm
Methyl ethyl ketone: 1.4 parts
Other Components
Stearic acid: 2.0 parts
Butyl stearate: 6.0 parts
Polyisocyanate (CORONATE (registered trademark) L manufactured by Nippon Polyurethane Industry Co., Ltd.): 2.5 parts
Finishing Additive Solvent
Cyclohexanone: 200.0 parts
Methyl ethyl ketone: 200.0 parts
The activation volume is a value obtained by the following method.
The powder in a powder lot which is the same as that of ferromagnetic hexagonal barium ferrite powder used in the preparation of the magnetic layer forming composition was used as a measurement sample of the activation volume. The magnetic field sweep rates in the He measurement part at timing points of 3 minutes and 30 minutes were measured by using an oscillation sample type magnetic-flux meter (manufactured by Toei Industry Co., Ltd.), and the activation volume was calculated from the relational expression described above. The measurement was performed in the environment of 23° C.±+1° C.

(3) Non-Magnetic Layer Forming Composition List
Non-magnetic inorganic powder: α-iron oxide: 100.0 parts
Average particle size (average long axis length): 0.15 μm
Average acicular ratio: 7
BET specific surface area: 52 $m^2/g$
Carbon black: 20.0 parts
Average particle size: 20 nm
$SO_3Na$ group-containing polyurethane resin: 18.0 parts
Weight-average molecular weight: 70,000, $SO_3Na$ group: 0.2 meq/g
Stearic acid: 1.0 parts
Cyclohexanone: 300.0 parts
Methyl ethyl ketone: 300.0 parts
(4) Back Coating Layer Forming Composition List
Non-magnetic inorganic powder: α-iron oxide: 80.0 parts
Average particle size (average long axis length): 0.15 μm
Average acicular ratio: 7
BET specific surface area: 52 $m^2/g$
Carbon black: 20.0 parts
Average particle size: 20 nm
A vinyl chloride copolymer: 13.0 parts
Sulfonic acid group-containing polyurethane resin: 6.0 parts
Phenylphosphonic acid: 3.0 parts
Stearic acid: 3.0 parts
Butyl stearate: 3.0 parts Polyisocyanate (CORONATE L manufactured by Nippon Polyurethane Industry Co., Ltd.): 5.0 parts Methyl ethyl ketone: 155.0 parts Cyclohexanone: 355.0 parts (5) Preparation of Each Layer Forming Composition (i) Preparation of Magnetic Layer Forming Composition The magnetic layer forming composition was prepared by the following method.

A magnetic solution was prepared by performing beads-dispersing of the magnetic solution components described above by using beads as the dispersion medium in a batch type vertical sand mill. Specifically, the dispersing process was performed for the dispersion retention time (retention time in a dispersing machine) shown in Table 1 by using zirconia beads having a bead diameter shown in Table 1 as the beads dispersion of each stage (first stage or second stage). In the beads dispersion, dispersion liquid obtained by using a filter (hole diameter of 5 μm) was filtered after completion of each stage. In the beads dispersion of each stage, the filling percentage of the dispersion medium was set to be approximately 50 to 80 volume %.

The magnetic solution obtained as described above was mixed with the abrasive liquid, silica sol, other components, and the finishing additive solvent and beads-dispersed for 5 minutes by using the sand mill, and ultrasonic dispersion was performed with a batch type ultrasonic device (20 kHz, 300 W) for 0.5 minutes. After that, the obtained mixed liquid was filtered by using a filter (hole diameter of 0.5 μm), and the magnetic layer forming composition was prepared.

A circumferential speed of a distal end of the sand mill at the time of beads dispersion was in a range of 7 to 15 m/sec.

(ii) Preparation of Non-Magnetic Layer Forming Composition

The non-magnetic layer forming composition was prepared by the following method.

Each component excluding stearic acid, cyclohexanone, and methyl ethyl ketone was beads-dispersed by using a batch type vertical sand mill (dispersion medium: zirconia beads (bead diameter: 0.1 mm), dispersion retention time: 24 hours) to obtain dispersion liquid. After that, the remaining components were added into the obtained dispersion liquid and stirred with a dissolver. Then, the obtained dispersion liquid was filtered by using the filter (hole diameter of 0.5 μm), and a non-magnetic layer forming composition was prepared.

(iii) Preparation of Back Coating Layer Forming Composition

The back coating layer forming composition was prepared by the following method.

Each component excluding stearic acid, butyl stearate, polyisocyanate, and cyclohexanone was kneaded and diluted by an open kneader. Then, the obtained mixed liquid was subjected to a dispersing process of 12 passes, with a transverse beads mill by using zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. Then, the obtained dispersion liquid was filtered with a filter (hole diameter of 1 μm) and a back coating layer forming composition was prepared.

(6) Manufacturing of Magnetic Tape

A magnetic tape was manufactured by the specific aspect shown in FIG. 6. The magnetic tape was specifically manufactured as follows.

A support made of polyethylene naphthalate having a thickness of 5.00 μm was sent from the sending part, and the non-magnetic layer forming composition prepared in the section (5)(ii) was applied to one surface thereof so that the thickness after the drying becomes 0.10 μm in the first coating part and was dried in the first heating process zone (atmosphere temperature of 100° C.) to form a coating layer.

Then, the magnetic layer forming composition prepared in the section (5)(i) was applied onto the non-magnetic layer so that the thickness after the drying becomes 70 nm in the second coating part, and a coating layer was formed. The cooling step was performed by passing the formed coating layer through the cooling zone in which the atmosphere temperature is adjusted to 0° C. for the staying time shown in Table 1 while the coating layer is wet, a homeotropic alignment process was performed in the orientation zone by applying a magnetic field having a magnetic field strength of 0.3 T in a vertical direction, and then, the coating layer was dried in the second heating process zone (atmosphere temperature of 100° C.).

After that, in the third coating part, the back coating layer forming composition prepared in the section (5)(iii) was applied to the surface of the support made of polyethylene naphthalate on a side opposite to the surface where the non-magnetic layer and the magnetic layer are formed, so that the thickness after the drying becomes 0.40 pun, to form a coating layer, and the formed coating layer was dried in the third heating process zone (atmosphere temperature of 100° C.).

The magnetic tape obtained as described above was slit to have a width of ½ inches (0.0127 meters), and the burnishing treatment and the wiping treatment were performed with respect to the surface of the coating layer of the magnetic layer forming composition. The burnishing treatment and the wiping treatment were performed by using a commercially available polishing tape (product name: MA22000 manufactured by Fujifilm Corporation, abrasive: diamond/$Cr_2O_3$/red oxide) as the polishing tape, a commercially available sapphire blade (manufactured by Kyocera Corporation, a width of 5 mm, a length of 35 mm, and a tip angle of 60 degrees) as the grinding blade, and a commercially available wiping material (product name: WRP736 manufactured by Kuraray Co., Ltd.) as the wiping material, in a treatment device having a configuration disclosed in FIG. 1 of JP1994-52544A (JP-H06-52544A). For the treatment conditions, the treatment conditions disclosed in Example 12 of JP1994-52544A (JP-H06-52544A).

After the burnishing treatment and the wiping treatment, a calender process (surface smoothing treatment) was performed with a calender roll configured of only a metal roll, at a speed of 80 m/min, linear pressure of 300 kg/cm (294 kN/m), and a calender temperature (surface temperature of a calender roll) shown in Table 1.

After that, a heating process (curing process) was performed in the environment of the atmosphere temperature of 70° C. for 36 hours.

By doing so, a magnetic tape of Example 1 was manufactured.

The thickness of each layer of the manufactured magnetic tape was acquired by the following method and it was confirmed that the acquired thickness is the thickness described above.

A cross section of the magnetic tape in a thickness direction was exposed to ion beams and the exposed cross section was observed with a scanning electron microscope.

Various thicknesses were obtained as an arithmetical mean of thicknesses obtained at two portions in the thickness direction in the cross section observation.

Examples 2 to 11 and Comparative Examples 1 to 7

Each magnetic tape of Examples 2 to 11 and Comparative Examples 1 to 7 was obtained in the same manner as in Example 1, except that the manufacturing conditions were changed as shown in Table 1.

In Examples and Comparative Examples in which "performed" was shown in the column of the homeotropic alignment process in Table 1, the homeotropic alignment process was performed in the same manner as in Example 1.

In Comparative Examples in which "not performed" was shown in the column of the homeotropic alignment process in Table 1, the magnetic layer was formed without performing the homeotropic alignment process.

In Table 1, in the comparative examples in which "not performed" is disclosed in a column of the cooling zone staying time of the magnetic layer forming step and a column of the burnishing treatment before the curing process, a magnetic tape was manufactured by a manufacturing step not including a cooling zone in the magnetic layer forming step and not performing the burnishing treatment and the wiping treatment.

In Table 1, the "compound 1" is a compound 1 disclosed in Table 1 of JP2016-177851A. In Table 1, the "compound 2" is a compound 2 disclosed in Table 1 of JP2016-177851A. In Table 1, the "compound J-1" is a polyalkyleneimine derivative J-1 disclosed in Table 2 of JP2016-177851A. In Comparative Example 7, 2,3-dihydroxynaphthalene was used instead of the compound 1, 2 or J-1. 2,3-dihydroxynaphthalene is a compound used as an additive for adjusting a squareness ratio in JP2012-203955A.

A part of each magnetic tape of the examples and the comparative examples manufactured by the method described above was used in the evaluation described below, and the other part was used in the evaluation of performance which will be described later.

2. Evaluation of Physical Properties of Magnetic Tape (1) Center Line Average Surface Roughness Ra Measured Regarding Surface of Magnetic Layer The measurement regarding a measurement area of 40 µm×40 µm in the surface of the magnetic layer of each magnetic tape of the examples and the comparative examples was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 µm/sec, and a resolution was set as 512 pixel×512 pixel.

(2) Measurement of cos θ

A cross section observation sample was cut out from each magnetic tape of the examples and the comparative examples and cos θ was acquired by the method described above by using this sample. In each magnetic tape of Examples 1 to 11 and Comparative Examples 1 to 7, a percentage of hexagonal ferrite particles having the aspect ratio and the length in the long axis direction of the ranges described above which is a measurement target of cos θ occupying all of the hexagonal ferrite particles observed in the STEM image, was approximately 80% to 95% based on the particle number.

The cross section observation sample used for the measurement of cos θ was manufactured by the following method.

(i) Manufacturing of Sample Including Protective Film

A sample including a protective film (laminated film of a carbon film and a platinum film) was manufactured by the following method.

A sample having a size of a width direction 10 mm×longitudinal direction 10 mm of the magnetic tape was cut out from the magnetic tape which is a target acquiring the cos θ, with a blade. The width direction of the sample described below is a direction which was a width direction of the magnetic tape before the cutting out. The same applies to the longitudinal direction.

A protective film was formed on the surface of the magnetic layer of the cut-out sample by the following method to obtain a sample including a protective film.

A carbon film (thickness of 80 nm) was formed on the surface of the magnetic layer of the sample by vacuum deposition, and a platinum (Pt) film (thickness of 30 nm) was formed on the surface of the formed carbon film by sputtering. The vacuum deposition of the carbon film and the sputtering of the platinum film were respectively performed under the following conditions.

Vacuum Deposition Conditions of Carbon Film

Deposition source: carbon (core of a mechanical pencil having a diameter of 0.5 mm)

Degree of vacuum in a chamber of a vacuum deposition device: equal to or smaller than $2\times10^{-3}$ Pa Current value: 16 A Sputtering Conditions of Platinum Film Target: Pt Degree of vacuum in a chamber of a sputtering device: equal to or smaller than 7 Pa Current value: 15 mA (ii) Manufacturing Cross Section Observation Sample A sample having a thin film shape was cut out from the sample including a protective film manufactured in the section (i), by FIB processing using a gallium ion ($Ga^+$) beam. The cutting out was performed by performing the following FIB processing two times. An acceleration voltage of the FIB processing was 30 kV.

In a first FIB processing, one end portion (that is, portion including one side surface of the sample including a protective film in the width direction) of the sample including a protective film on the longitudinal direction, including the area from the surface of the protective film to a region of a depth of approximately 5 µm was cut. The cut-out sample includes the area from the protective film to a part of the non-magnetic support.

Then, a microprobe was loaded on a cut-out surface side (that is, sample cross section side exposed by the cutting out) of the cut-out sample and the second FIB processing was performed. In the second FIB processing, the surface side opposite to the cut-out surface side (that is, one side surface in the width direction) was irradiated with a gallium ion beam to perform the cutting out of the sample. The sample was fixed by bonding the cut-out surface of the second FIB processing to the end surface of the mesh for STEM observation. After the fixation, the microprobe was removed.

In addition, the surface of the sample fixed to the mesh, from which the microprobe is removed, was irradiated with a gallium ion beam at the same acceleration voltage described above, to perform the FIB processing, and the sample fixed to the mesh was further thinned.

The cross section observation sample fixed to the mesh manufactured as described above was observed by a scanning transmission electron microscope, and the cos θ was acquired by the method described above. The cos θ acquired as described above is shown in Table 1.

(3) Measurement of Logarithmic Decrement

The logarithmic decrement of the surface of the magnetic layer of the magnetic tape was acquired by the method described above by using a rigid-body pendulum type physical properties testing instrument RPT-3000W manufactured by A&D Company, Limited (pendulum: brass, substrate: glass substrate, a rate of temperature increase of substrate: 5° C./min) as the measurement device. A measurement sample cut out from the magnetic tape was placed on a glass substrate having a size of approximately 3 cm×approximately 5 cm, by being fixed at 4 portions with a fixing tape (Kapton tape manufactured by Du Pont-Toray Co., Ltd.) as shown in FIG. 1. An adsorption time was set as 1 second, a measurement interval was set as 7 to 10 seconds, a displacement-time curve was drawn regarding the 86-th measurement interval, and the logarithmic decrement was acquired by using this curve. The measurement was performed in the environment of relative humidity of approximately 50%.

(4) Evaluation of Squareness Ratio (SQ)

The squareness ratio of each magnetic tape of the examples and the comparative examples was measured at a magnetic field strength of 1194 kA/m(15 kOe) by using an oscillation sample type magnetic-flux meter (manufactured by Toei Industry Co., Ltd.).

3. Evaluation of Performance of Magnetic Tape (1) Amount of Reproducing Output During Repeated High-Speed Running in environment of High Temperature and Low Humidity Regarding each magnetic tape of the examples and the comparative examples, the amount of a decrease in reproducing output during the repeated running was measured by the following method by using a reel tester having a width of ½ inches (0.0127 meters) and including a fixed head. The measurement was performed in an environment of an atmosphere temperature of 32° C. and relative humidity of 10%.

A head/tape relative speed was set as 8.0/sec, a metal-in-gap (MIG) head (gap length of 0.15 μm, track width of 1.0 μm) was used in the recording, and a recording current was set as an optimal recording current of each magnetic tape. As a reproducing head, a giant-magnetoresistive (GMR) head having an element thickness of 15 nm, a shield interval 0.1 μm, and a lead width of 0.5 μm was used. A signal having linear recording density of 300 kfci was recorded and measurement regarding a reproduction signal was performed with a spectrum analyzer manufactured by Shibasoku Co., Ltd. The unit, kfci, is a unit of linear recording density (not able to convert to the SI unit system). Regarding the signal, a signal which was sufficiently stabilized after starting the running of the magnetic tape was used. The sliding of 500 passes was performed by sliding 1,000 m per 1 pass to perform the reproducing.

An output value of a carrier signal of the first pass and an output value of a carrier signal of 500-th pass were respectively obtained, and a difference of "(output value of 500-th pass)−(output value of first pass)" was shown in Table 1 as the amount of a decrease in reproducing output during the repeated running.

(2) Evaluation of Amount of Head Attached Materials

After the measurement in the section (1), the surface of the reproducing head after reciprocating of 500 passes was observed with a differential interference microscope, and the amount of head attached materials was determined with the following criteria, in accordance with the size of the area in which the attached materials were confirmed in a microscopic image obtained with the differential interference microscope.

5 points: Substantially no head attached materials were observed.

4 points: a slight amount of head attached materials was observed.

3 points: Head attached materials were observed (the amount thereof is greater than that in a case of 4 points and smaller than that in a case of 2 points).

2 points: A large amount of head attached materials was observed.

1 point: An extremely large amount of head attached materials was observed.

The results described above are shown in Table 1.

TABLE 1

| | Ferromagnetic hexagonal ferrite powder activation volume [mm$^1$] | Dispersing agent Type | Dispersing agent Content [part] | Magnetic solution beads dispersion conditions | | | | | |
|---|---|---|---|---|---|---|---|---|---|
| | | | | First stage | | Second stage | | Third stage | |
| | | | | Dispersion staying time [h] | Bead diameter [mm] | Dispersion staying time [h] | Bead diameter [mm] | Dispersion staying time [h] | Bead diameter [mm] |
| Comparative Example 1 | 2,000 | — | — | 10 | 0.5 | — | — | — | — |
| Comparative Example 2 | 2,000 | — | — | 10 | 0.5 | — | — | — | — |
| Comparative Example 3 | 2,000 | — | — | 10 | 0.5 | — | — | — | — |
| Comparative Example 4 | 2,000 | — | — | 10 | 0.5 | — | — | — | — |
| Comparative Example 5 | 2,000 | — | — | 10 | 0.5 | — | — | — | — |
| Comparative Example 6 | 2,000 | Compound 1 | 6.0 | 10 | 0.5 | 10 | 0.1 | — | — |
| Comparative Example 7 | 2,000 | 2,3-Dihydroxynaphthalene | 12.0 | 10 | 0.5 | 10 | 0.1 | — | — |
| Example 1 | 2,000 | Compound 1 | 6.0 | 10 | 0.5 | 10 | 0.1 | — | — |
| Example 2 | 2,000 | Compound 1 | 12.0 | 10 | 0.5 | 10 | 0.1 | — | — |
| Example 3 | 2,000 | Compound 1 | 12.0 | 10 | 0.5 | 10 | 0.1 | 10 | 0.05 |
| Example 4 | 2,000 | Compound 2 | 6.0 | 10 | 0.5 | 10 | 0.1 | — | — |

TABLE 1-continued

| | | | | | | | | | |
|---|---|---|---|---|---|---|---|---|---|
| Example 5 | 2,000 | Compound J-1 | 6.0 | 10 | 0.5 | 10 | 0.1 | — | — |
| Example 6 | 1,600 | Compound 1 | 6.0 | 10 | 0.5 | 10 | 0.1 | — | — |
| Example 7 | 2,000 | Compound 1 | 6.0 | 10 | 0.5 | 10 | 0.1 | — | — |
| Example 8 | 2,000 | Compound 1 | 6.0 | 10 | 0.5 | 10 | 0.1 | — | — |
| Example 9 | 2,000 | Compound 1 | 6.0 | 10 | 0.5 | 10 | 0.1 | — | — |
| Example 10 | 2,000 | Compound 1 | 6.0 | 10 | 0.5 | 10 | 0.1 | — | — |
| Example 11 | 2,000 | Compound 1 | 12.0 | 10 | 0.5 | 10 | 0.1 | 10 | 0.05 |

| | Homeotropic alignment process | Cooling zone staying time | Burnishing treatment before curing process | Results of evaluation of physical properties | | | | Results of evaluation of performance | |
|---|---|---|---|---|---|---|---|---|---|
| | | | | Calender temperature | Ra | SQ [—] | cosθ [—] | Logarithmic decrement | Head attached materials (large 1 ⇔ 5 small) | Amount of decrease in reproducing output [dB] |
| Comparative Example 1 | Not performed | Not performed | Not performed | 90° C. | 2.3 mm | 0.58 | 0.68 | 0.062 | 5 | −0.5 |
| Comparative Example 2 | Not performed | Not performed | Not performed | 100° C. | 1.8 mm | 0.58 | 0.68 | 0.062 | 2 | −2.5 |
| Comparative Example 3 | Not performed | Not performed | Not performed | 110° C. | 1.6 mm | 0.58 | 0.68 | 0.062 | 1 | −3.3 |
| Comparative Example 4 | Not performed | Not performed | Not performed | 120° C. | 1.4 mm | 0.58 | 0.68 | 0.062 | 1 | −3.7 |
| Comparative Example 5 | Not performed | 1 second | Performed | 100° C. | 1.8 mm | 0.58 | 0.68 | 0.048 | 3 | −1.9 |
| Comparative Example 6 | Performed | Not performed | Not performed | 100° C. | 1.8 mm | 0.73 | 0.87 | 0.062 | 3 | −1.7 |
| Comparative Example 7 | Performed | Not performed | Not performed | 100° C. | 1.8 mm | 0.78 | 0.80 | 0.062 | 2 | −3.0 |
| Example 1 | Performed | 1 second | Performed | 100° C. | 1.8 mm | 0.73 | 0.87 | 0.048 | 5 | −0.4 |
| Example 2 | Performed | 1 second | Performed | 100° C. | 1.8 mm | 0.74 | 0.96 | 0.048 | 5 | −0.3 |
| Example 3 | Performed | 1 second | Performed | 100° C. | 1.8 mm | 0.74 | 0.98 | 0.048 | 5 | −0.3 |
| Example 4 | Performed | 1 second | Performed | 100° C. | 1.8 mm | 0.73 | 0.87 | 0.048 | 5 | −0.4 |
| Example 5 | Performed | 1 second | Performed | 100° C. | 1.8 mm | 0.73 | 0.85 | 0.048 | 5 | −0.4 |
| Example 6 | Performed | 1 second | Performed | 100° C. | 1.8 mm | 0.72 | 0.86 | 0.048 | 5 | −0.3 |
| Example 7 | Performed | 60 seconds | Performed | 100° C. | 1.8 mm | 0.73 | 0.87 | 0.030 | 5 | −0.2 |
| Example 8 | Performed | 180 seconds | Performed | 100° C. | 1.8 mm | 0.73 | 0.87 | 0.015 | 5 | −0.1 |
| Example 9 | Performed | 1 second | Performed | 110° C. | 1.6 mm | 0.73 | 0.87 | 0.048 | 5 | −0.3 |
| Example 10 | Performed | 1 second | Performed | 120° C. | 1.4 mm | 0.73 | 0.87 | 0.048 | 5 | −0.4 |
| Example 11 | Performed | 180 seconds | Performed | 120° C. | 1.4 mm | 0.74 | 0.98 | 0.015 | 5 | 0 |

From the comparison of Comparative Example 1 and Comparative Examples 2 to 7 shown in Table 1, it is possible to confirm that a decrease in reproducing output during the repeated high-speed running in the environment of a high temperature and low humidity significantly occurs in the magnetic tape including the magnetic layer having high surface smoothness in which the Ra is equal to or smaller than 1.8 nm.

On the other hand, from the results shown in Table 1, it is possible to confirm that, in the magnetic tapes of Examples 1 to 11, the magnetic layer surface roughness Ra is equal to or smaller than 1.8 nm and a decrease in reproducing output during the repeated high-speed running in the environment of a high temperature and low humidity is prevented. From the comparison of Examples 1 to 11 and Comparative Examples 2 to 7, it is possible to assume that a decrease in the amount of head attached materials prevents a decrease in reproducing output during the repeated high-speed running in the environment of a high temperature and low humidity.

As shown in Table 1, a correlation between the squareness ratio (SQ) and a degree of a decrease in reproducing output was not observed.

The invention is effective in technical fields of magnetic tapes used as recording media for data storage.

What is claimed is:

1. A magnetic tape comprising:
a non-magnetic support; and
a magnetic layer including ferromagnetic powder and a binding agent on the non-magnetic support,
wherein the center line average surface roughness Ra measured regarding the surface of the magnetic layer is equal to or smaller than 1.8 nm,
the logarithmic decrement acquired by a pendulum viscoelasticity test performed regarding the surface of the magnetic layer is 0.015 to 0.050,
the ferromagnetic powder is ferromagnetic hexagonal ferrite powder,
the magnetic layer includes an abrasive,
the tilt cos θ of the ferromagnetic hexagonal ferrite powder with respect to the surface of the magnetic layer acquired by cross section observation performed by using a scanning transmission electron microscope is 0.85 to 1.00, and
the logarithmic decrement on the magnetic layer side is determined by the following method:
securing a measurement sample of the magnetic tape with the measurement surface, which is the surface on the magnetic layer side, facing upward on a substrate in a pendulum viscoelasticity tester;

disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;

raising the surface temperature of the substrate on which the measurement sample has been positioned at a rate of less than or equal to 5° C./min up to 80° C.;

inducing initial oscillation of the pendulum;

monitoring the displacement of the pendulum while it is oscillating to obtain a displacement-time curve for a measurement interval of greater than or equal to 10 minutes; and obtaining the logarithmic decrement $\Delta$ from the following equation:

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation).

2. The magnetic tape according to claim 1, wherein the center line average surface roughness Ra is 1.2 nm to 1.8 nm.

3. The magnetic tape according to claim 1, further comprising:
a non-magnetic layer including non-magnetic powder and a binding agent between the non-magnetic support and the magnetic layer.

4. The magnetic tape according to claim 1, further comprising:
a back coating layer including non-magnetic powder and a binding agent on a surface side of the non-magnetic support opposite to the surface side provided with the magnetic layer.

* * * * *